US007656586B2

(12) United States Patent
Rosario et al.

(10) Patent No.: US 7,656,586 B2
(45) Date of Patent: Feb. 2, 2010

(54) REARVIEW MIRROR FOR A MOTOR VEHICLE

(75) Inventors: Daniel Rosario, Santa Cruz, CA (US); Pao Hsu Chen, Milpitas, CA (US); Cedric Dupont, San Francisco, CA (US); Arne Stoschek, Palo Alto, CA (US); Will Specks, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/738,054

(22) Filed: Apr. 20, 2007

(65) Prior Publication Data

US 2007/0279756 A1   Dec. 6, 2007

Related U.S. Application Data

(63) Continuation of application No. PCT/EP2005/009333, filed on Aug. 30, 2005.

(60) Provisional application No. 60/622,249, filed on Oct. 26, 2004.

(51) Int. Cl.
G02B 27/14 (2006.01)
(52) U.S. Cl. ...................... 359/633; 359/265
(58) Field of Classification Search .................. 359/633
See application file for complete search history.

(56) References Cited

U.S. PATENT DOCUMENTS

| 5,631,638 | A | 5/1997 | Kaspar et al. ............... 340/902 |
| 5,864,432 | A | 1/1999 | Deter ......................... 359/634 |
| 6,407,408 | B1 | 6/2002 | Zhou et al. .................... 257/40 |
| 6,481,851 | B1 | 11/2002 | McNelley et al. ............... 353/28 |
| 6,646,697 | B1 | 11/2003 | Sekiguchi et al. ............. 349/73 |
| 6,646,806 | B1 | 11/2003 | Bierhuizen .................. 359/618 |
| 6,648,477 | B2 | 11/2003 | Hutzel et al. ................ 359/604 |
| 6,700,692 | B2 | 3/2004 | Tonar et al. .................. 359/265 |
| 6,747,618 | B2 | 6/2004 | Arnold et al. ................. 345/77 |
| 6,753,999 | B2 | 6/2004 | Zehner et al. ............... 359/296 |
| 2001/0013825 | A1 | 8/2001 | DeLine et al. ........... 340/425.5 |
| 2001/0055143 | A1 | 12/2001 | Ash et al. .................... 359/267 |
| 2002/0070872 | A1 | 6/2002 | Deline et al. ............. 340/815.4 |
| 2003/0043480 | A1 | 3/2003 | Burgner et al. .............. 359/844 |

(Continued)

FOREIGN PATENT DOCUMENTS

| DE | 19741896 | 4/1999 |
| EP | 0635395 | 5/1994 |
| EP | 0719675 | 11/1995 |
| WO | WO 03/079318 | * 9/2003 |

OTHER PUBLICATIONS

Internation Search Report; PCT/EP2005/009333; Pgs. 20, Jan. 2, 2006.

*Primary Examiner*—Jordan M. Schwartz
*Assistant Examiner*—James C Jones
(74) *Attorney, Agent, or Firm*—King & Spalding L.L.P.

(57) ABSTRACT

A rear-view mirror (3) for a motor vehicle is provided with a reflector layer (40) which is used to reflect light which impinges on the rear-view mirror (3) from a first viewing direction, a display layer (36) which is arranged behind the reflector layer (40) in relation to the viewing direction (41) and which is used to emit light, a quarter wave plate (74) which is arranged between the display layer (36) and the reflector layer (40) and a reflecting linear-polarisation layer (73) which is arranged between the display layer and the quarter wave plate (74).

39 Claims, 8 Drawing Sheets

U.S. PATENT DOCUMENTS

| | | | |
|---|---|---|---|
| 2003/0095047 A1 | 5/2003 | DeLine et al. | 340/815.4 |
| 2003/0222982 A1 | 12/2003 | Hamdan et al. | 348/148 |
| 2004/0032675 A1 | 2/2004 | Weller et al. | 359/872 |
| 2004/0032676 A1 | 2/2004 | Drummond et al. | 359/877 |
| 2004/0114384 A1 | 6/2004 | Carter et al. | 362/494 |
| 2004/0202001 A1* | 10/2004 | Roberts et al. | 362/494 |
| 2004/0245902 A1* | 12/2004 | Li et al. | 313/112 |
| 2005/0185278 A1* | 8/2005 | Horsten et al. | 359/487 |

* cited by examiner

REARVIEW MIRROR FOR A MOTOR VEHICLE

CROSS-REFERENCE TO RELATED APPLICATION

This application is a continuation of co-pending International Application No. PCT/EP2005/009333 filed Aug. 30, 2005, which designates the United States, and claims priority to U.S. Provisional application No. 60/622,249 filed Oct. 26, 2004.

TECHNICAL FIELD

The invention concerns a rearview mirror for a motor vehicle.

BACKGROUND

Such a rearview mirror may consist of a reflector layer for the reflection of light striking the mirror from a viewing direction and a display layer arranged behind the reflector layer relative to the viewing direction for the emission of light. Such a rearview mirror fulfills, in particular, a dual function. On the one hand, it serves as a rearview mirror in the conventional sense and on the other, as a display when the display layer emits light.

U.S. Pat. No. 6,106,121 discloses a rearview mirror for a vehicle, wherein the rearview mirror includes an LCD display and two polarizing layers that are transparent when in an unpowered state.

A mirror with a display is sold by Philips as MirrorTV. Details may be obtained, e.g., from the websites having the internet addresses www.ces2004.philips.com/downloads/press-releases/business-productivity/MirrorTV.pdf and www.pcworld.com/resource/printable/article/O,aid, 111100,OO.asp EP 0 719 675 B1 discloses an interior mirror of a motor vehicle with a display device, said display device consisting of a mirror body, a rearview mirror provided in a front opening of the mirror body for reflecting an image behind a vehicle back to a viewing point of a driver and an information-displaying mirror provided in the mirror body for reflecting the visual information displayed by a light emitting display device back to the viewing point of the driver through the information display region, said rearview mirror displaying a semipermeable reflecting film applied to the entire rear surface of a glass substrate and a black-coated film applied to the rear surface of the semipermeable reflection film, part of the black-coated film being removed for presenting the information display and in which slits are provided in the light emission display device for guiding the information displayed by the light emitting display device in the direction of the information displaying mirror.

EP 0 635 395 B1 discloses an information device in a motor vehicle that includes an electronic circuit that can be connected to the vehicle's power system and one or more sensors, an display device and optionally operating elements, where the sensor and the circuit are installed in the housing of an interior mirror of the vehicle, and where the circuit is connected by a cable guided through a hollow supporting arm of the interior mirror and connectable to the vehicle's power system, and in which the display device is integrated in the mirror glass of the interior mirror.

DE 197 41 896 C2 discloses a device for displaying images of the environment around a motor vehicle in a field of vision of a driver situated in the interior of the motor vehicle, said device including at least one image screen, on which image information registered by sensors and processed electronically is displayed, at least one camera being present that is equipped with a sensor for registering image information and information on the spatial position of objects in the area surrounding the vehicle, and a control unit is provided for electronic processing of the image information registered by the sensors, the operating characteristics of the vehicle being fed to the control unit as input magnitudes, and said control unit switches back and forth between different modes of video display as a function of the operating characteristics.

Other mirrors are known from U.S. Pat. No. 6,646,697 (incorporated by reference), U.S. Pat. No. 5,864,432 (incorporated by reference), U.S. Pat. No. 6,700,692 (incorporated by reference), U.S. Pat. No. 6,648,477 (incorporated by reference), U.S. Pat. No. 6,646,806 (incorporated by reference), US 2003/0222982 (incorporated by reference), US 2004/0032675 (incorporated by reference), US 2004/0114384 (incorporated by reference), US 2004/0032676 (incorporated by reference), US 2003/0095047 (incorporated by reference), US 2003/0043480 (incorporated by reference), US 2002/0070872 (incorporated by reference), US 2001/0055143 (incorporated by reference) and US 2001/0013825 (incorporated by reference).

SUMMARY

A rearview mirror can be improved with a mirror function and a display function. According to an embodiment, a rearview mirror for a motor vehicle, may comprise a reflector layer for reflecting light that strikes the rearview mirror from a viewing direction; a display layer for emitting light arranged behind the reflector layer relative to the viewing direction; a quarter waveplate arranged between the display layer and the reflector layer; and a reflecting linear polarization layer arranged between the display layer and the quarter waveplate.

BRIEF DESCRIPTION OF THE DRAWINGS

Other advantages and details may derived from the following description of examples of embodiment.

DETAILED DESCRIPTION

Figure 1:
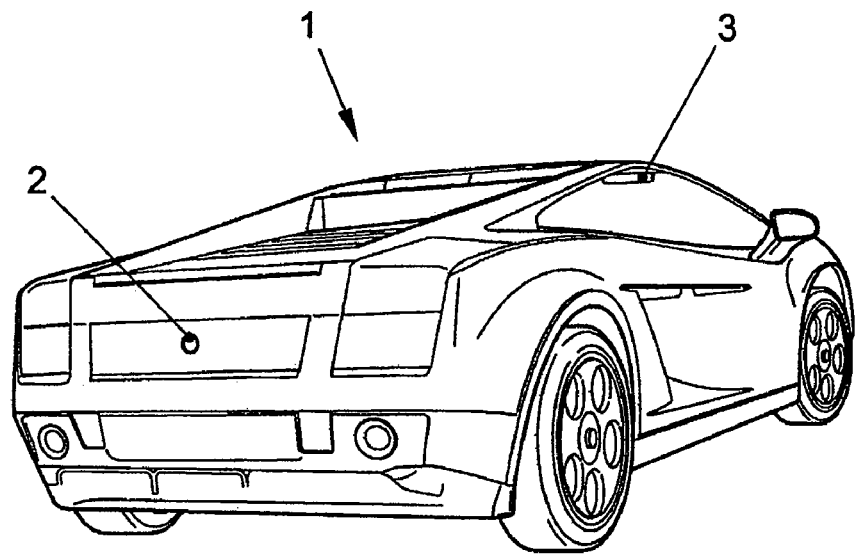
FIG. 1 shows an example of embodiment of a motor vehicle.

A quarter waveplate may also be called an λ/4 plate. A quarter waveplate is used, e.g., as part of a circular polarizer. The quarter waveplate used according to an embodiment in this case in particular is not a deactivatable layer, such as that envisioned in U.S. Pat. No. 6,106,121. Suitable quarter waveplates can be obtained from the Polatechno Co., Ltd., Japan, www.polatechno.co.jp. Details on a quarter waveplate and circular polarizers can be obtained from the URL www.fas.harvard.edu~scdiroff/lds/LightOptics/CircularPolaization/CircularPolarization.html A quarter waveplate in the sense of the invention is, in particular, a layer/film for rotating the polarization of light passing through the quarter waveplate by essentially 45 degrees.

A reflecting linear polarization layer in the sense of the invention is, in particular, a layer or film that is essentially transparent for polarized light emitted from the display layer essentially in the through-passing direction and which essentially reflects the polarized light emitted by the display layer essentially orthogonally to the through-passing direction. The reflecting linear polarization layer may, for example, be designed as a so-called DBEF filter layer. Details regarding a DBEF filter layer may be obtained, e.g., from U.S. Pat. No. 6,747,618, (incorporated by reference), U.S. Pat. No. 6,753,999, (incorporated by reference), U.S. Pat. No. 6,481,851, (incorporated by reference) and U.S. Pat. No. 6,407,408 (incorporated by reference). Further details on a DBEF filter layers may be obtained, e.g., from the URLs:

Produkts3.3m.com/catalog/us/en001/electronics_mfg/
vikuiti/node_L9VF6WSX2Jbe/root_GST1T4S9TCgv/
vroot_S6Q2FD9XOJge/gvel_4Q2VBPLNL5gl/theme_
us_vikuiti_3_0/command_AbcPageHandler/output_print
and the patents cited therein.

The reflector layer is semitransparent especially in the sense that it is transparent for light emitted from the display layer but reflects light striking the rearview mirror from a viewing direction.

According to an embodiment, the display layer includes a reflecting surface facing in the viewing direction.

According to another embodiment, the rearview mirror also includes an anti-reflection layer arranged in front of the quarter waveplate relative to the viewing direction. Suitable anti-reflection layers are sold by Integrated Optical Services Corp., 291 Sinclair Frontage Rd., Milpitas, Calif. 95035, USA and Southwall Technologies Corp., 3975 East Bayshore Rd., Palo Alto, Calif. 94303, USA.

According to another embodiment, the anti-reflection layer is connected to the quarter waveplate.

LCDs, for example, may be considered for implementing the display layer. According to yet another embodiment, the display layer includes an OLED layer (polymer or especially small molecule) especially with a reflecting surface facing in the viewing direction.

According to another embodiment, the reflector layer has a transparency of more than 99%, especially a transparency of more than 99.5%, for light striking the reflector layer against the viewing direction.

According to another embodiment, the reflector layer includes one or more compounds of the group of $TiO_2$, $SiO_2$, and $HfO_2$, especially a mixture of all of these compounds.

According to another embodiment, at least 40%, especially at least 45%, of the light emittable by the display layer against the viewing direction emerges from the rearview mirror against the viewing direction. According to another embodiment, a brightness of more than 350 cd/m$^2$, especially of more than 400 cd/m$^2$ can be achieved for light emerging from the rearview mirror against the viewing direction in the case of a light emitting display layer. That means, in a region of the rearview mirror in which the display layer delivers its full illuminating power, light with a brightness of more than 350 cd/m$^2$, especially more than 400 cd/m$^2$ is emitted. A brightness of more than 500 cd/m$^2$ can also be achieved for light emerging from the rearview mirror against the viewing direction in the case of a light emitting display layer.

According to another embodiment, a dimming layer for dimming the rearview mirror is arranged in front of the reflector layer relative to the viewing direction.

According to another embodiment, the rearview mirror also includes an absorbing linear polarization layer arranged between the quarter waveplate and the reflecting linear polarization layer. An absorbing linear polarization layer in the sense of the invention is, in particular, a layer that is essentially transparent for polarized light emitted from the display layer essentially in the through-passing direction and which essentially absorbs the polarized light emitted by the display layer essentially orthogonally to the through-passing direction. The through-passing direction of the reflecting linear polarization layer and the through-passing direction of the absorbing linear polarization layer are essentially parallel in another embodiment.

The above-noted problem is also solved by a rearview mirror for a motor vehicle, which rearview mirror consists of a reflector layer for the reflection of light striking the rearview mirror from a viewing direction, a display layer arranged behind the reflector layer relative to the viewing direction for the emission of light, and a quarter waveplate arranged between the display layer and the reflector layer, said reflector layer including one or more compounds of the group composed of $TiO_2$, $SiO_2$, and $HfO_2$.

According to an embodiment, the reflector layer contains a mixture of $TiO_2$, $SiO_2$ and $HfO_2$.

According to another embodiment, the display layer includes a reflecting surface facing in the viewing direction.

According to another embodiment, the rearview mirror also includes an anti-reflection layer arranged between the display layer and the reflector layer.

According to another embodiment, the rearview mirror also includes an anti-reflection layer arranged between the quarter waveplate and the reflector layer.

LCDs, for example, may be considered for implementing the display layer. According to yet another embodiment, the display layer includes an OLED layer (polymer or especially small molecule) especially with a reflecting surface facing in the viewing direction.

According to another embodiment, the reflector layer has a transparency of more than 99%, especially a transparency of more than 99.5%, for light striking the reflector layer against the viewing direction.

According to another embodiment, at least 40%, especially at least 45%, of the light emittable by the display layer against the viewing direction emerges from the rearview mirror against the viewing direction. According to another embodiment, a brightness of more than 350 cd/m$^2$, especially of more than 400 cd/m$^2$ can be achieved for light emerging from the rearview mirror against the viewing direction in the case of a light emitting display layer. That means, in a region of the rearview mirror in which the display layer delivers its full illuminating power, light with a brightness of more than 350 cd/m$^2$, especially more than 400 cd/m$^2$ is emitted. A brightness of more than 500 cd/m$^2$ can also be achieved for light emerging from the rearview mirror against the viewing direction in the case of a light emitting display layer.

According to another embodiment, a dimming layer for dimming the rearview mirror is arranged in front of the reflector layer relative to the viewing direction.

The above-noted problem is solved by a rearview mirror for a motor vehicle, which rearview mirror consists of a reflector layer for the reflection of light striking the rearview mirror from a viewing direction and a display layer (capable of being switched on and off) arranged behind the reflector layer for the emission of light in a direction against the viewing direction, where at least 40%, especially at least 45% of the light emittable by the display layer against the viewing direction emerges from the rearview mirror against the viewing direction. In this case, according to an embodiment, a quarter waveplate is arranged between the display layer and the reflector layer.

According to another embodiment, a brightness of more than 350 cd/m$^2$, especially of more than 400 cd/m$^2$, can be achieved for light emerging from the rearview mirror against the viewing direction in the case of a light emitting display layer. That means, in a region of the rearview mirror in which the display layer delivers its full illuminating power, light with a brightness of more than 350 cd/m$^2$, especially more than 400 cd/m$^2$ is emitted. A brightness of more than 500 cd/m$^2$ can also be achieved for light emerging from the rearview mirror against the viewing direction in the case of a light emitting display layer.

According to another embodiment, the rearview mirror also includes an anti-reflection layer arranged behind the reflector layer relative to the viewing direction and/or arranged in front of the reflector layer relative to the viewing direction.

LCDs, for example, may be considered for implementing the display layer. According to yet another embodiment, the display layer includes an OLED layer (polymer or especially small molecule).

According to another embodiment, the reflector layer has a transparency of more than 99%, especially a transparency of more than 99.5%, for light striking the reflector layer against the viewing direction.

According to another embodiment, the reflector layer includes one or more compounds of the group of TiO$_2$, SiO$_2$, and HfO$_2$, especially a mixture of all of these compounds.

According to another embodiment, a dimming layer for dimming the rearview mirror is arranged in front of the reflector layer relative to the viewing direction.

The above-noted problem is solved by a rearview mirror for a motor vehicle, which rearview mirror consists of a reflector layer for the reflection of light striking the mirror from a viewing direction and a display layer (capable of being switched on and off) arranged behind the reflector layer for the emission of light, where in the case of a light-emitting display layer a brightness of more than 350 cd/m$^2$, especially more than 400 cd/m$^2$, can be achieved for the light emerging from the rearview mirror against the viewing direction. That means, in a region of the rearview mirror in which the display layer delivers its full illuminating power, light with a brightness of more than 350 cd/m$^2$, especially more than 400 cd/m$^2$, is emitted. In this case, according to another embodiment, a quarter waveplate is arranged between the display layer and the reflector layer. A brightness of more than 500 cd/m$^2$ can also be achieved for light emerging from the rearview mirror against the viewing direction in the case of a light emitting display layer.

LCDs may be considered, e.g., for implementing the display layer. According to yet another embodiment, the display layer includes an OLED layer (polymer or especially small molecule).

According to another embodiment, the reflector layer has a transparency of more than 99%, especially a transparency of more than 99.5%, for light striking the reflector layer against the viewing direction.

According to another embodiment, the reflector layer includes one or more compounds of the group of TiO$_2$, SiO$_2$, and HfO$_2$, especially a mixture of all of these compounds.

According to another embodiment, a dimming layer for dimming the rearview mirror is arranged in front of the reflector layer relative to the viewing direction.

The above noted problem is solved by a rearview mirror for a motor vehicle, which rearview mirror consists of a reflector layer for the reflection of light striking the mirror from a viewing direction and a display layer (capable of being switched on and off) arranged behind the reflector layer relative to the viewing direction for the emission of light, a quarter waveplate arranged between the display layer and the reflector layer, an absorbing linear polarization layer arranged between the display layer and the quarter waveplate, and an absorbing linear polarization layer arranged between the display layer and the reflecting linear and reflecting linear polarization layer. The through-passing direction of the reflecting linear polarization layer and the through-passing direction of the absorbing linear polarization layer are essentially parallel according to another embodiment.

According to another embodiment, the display layer includes a reflecting surface facing in the viewing direction.

According to another embodiment, the rearview mirror also includes an anti-reflection layer arranged in front of the quarter waveplate relative to the viewing direction. According to another embodiment, the anti-reflection layer is connected to the quarter waveplate.

LCDs, for example, may be considered for implementing the display layer.

According to yet another embodiment, the display layer includes an OLED layer (polymer or especially small molecule) especially with a reflecting surface facing in the viewing direction.

According to another embodiment, the reflector layer has a transparency of more than 99%, especially a transparency of more than 99.5%, for light striking the reflector layer against the viewing direction.

According to another embodiment, the reflector layer includes one or more compounds of the group of TiO$_2$, SiO$_2$, and HfO$_2$, especially a mixture of all of these compounds.

According to another embodiment, at least 40%, especially at least 45%, of the light emittable by the display layer against the viewing direction emerges from the rearview mirror against the viewing direction. According to another embodiment, a brightness of more than 350 cd/m$^2$ especially of more than 400 cd/m$^2$, can be achieved for light emerging from the rearview mirror against the viewing direction in the case of a light emitting display layer. That means, in a region of the rearview mirror in which the display layer delivers its full illuminating power, light with a brightness of more than 350 cd/m$^2$, especially more than 400 cd/m$^2$, is emitted. A brightness of more than 500 cd/m$^2$ can also be achieved for light emerging from the rearview mirror against the viewing direction in the case of a light emitting display layer.

According to another embodiment, a dimming layer for dimming the rearview mirror is arranged in front of the reflector layer relative to the viewing direction.

According to another embodiment, the quarter waveplate is a passive layer. According to another embodiment, the reflecting linear polarization layer is a passive layer. According to another embodiment, the absorbing linear polarization layer is a passive layer.

The above-noted problem is also solved by a rearview mirror for a motor vehicle, which rearview mirror consists of a reflector layer for the reflection of light striking the rearview mirror from a viewing direction, a OLED layer arranged behind the reflector layer relative to the viewing direction for the emission of light, a first anti-reflection layer arranged between the OLED layer and the reflector layer, and a second anti-reflection layer arranged in front of the reflector layer relative to the viewing direction.

According to another embodiment, a dimming layer for dimming the rearview mirror is arranged in front of the reflector layer relative to the viewing direction.

The above-noted problem is solved by a rearview mirror for a motor vehicle, which rearview mirror consists of a reflector layer for the reflection of light striking the rearview mirror from a viewing direction, and a display layer (capable of being switched on and off) arranged behind the reflector layer relative to the viewing direction for the emission of light, where the reflector layer contains one or more compounds from the group consisting of $TiO_2$, $SiO_2$ and $HfO_2$, especially a mixture of all these compounds.

The above-noted problem is also solved by a motor vehicle with one of the above-noted rearview mirrors. Such a motor vehicle in one variant includes a camera connected by an IT system to the display layer for taking a picture of the area surrounding the vehicle, in which case it is envisioned in particular that the image recorded by the camera is optionally displayable in the rearview mirror by means of the display layer.

Motor vehicle in the sense of the invention refers in particular to a ground vehicle used individually in road traffic. Motor vehicles in the sense of the invention are not limited specifically to ground vehicles with internal combustion engines.

FIG. 1 shows an example of embodiment of a motor vehicle 1. The motor vehicle 1 contains a camera 2 that is IT-linked by means of a video adapter 5 shown in FIG. 2 to a rearview mirror 3 to take a picture of the surroundings of the motor vehicle 1. The camera 2 in this case is arranged in the example of embodiment shown essentially in the center of the trunk of the vehicle 1 so that a region behind the vehicle 1, and with it, e.g., as shown in FIG. 2, another vehicle behind the vehicle 1 is photographed by the camera 2 and can be displayed by the rearview mirror 3 which includes a display function as elaborated with reference to the following figures.

The rearview mirror 3 has a dual function. On the one hand, the rearview mirror 3 may be used as a rearview mirror in the conventional sense, and on the other, as a display, in which case optionally or coupled to certain operating states of the vehicle 1 it can be switched between the function as rearview mirror in the conventional sense and the function as a display. Thus, for example, it may be envisioned that the rearview mirror 3 will show an image taken by the camera 2 when the vehicle 1 is moving in reverse and that the rearview mirror 3 is a rearview mirror in the conventional sense when the vehicle 1 is moving forward.

Alternatively, or additionally, operating means such as switches or a voice command may be provided for optional switching between the two above-noted states of the rearview mirror 3.

Figure 2:
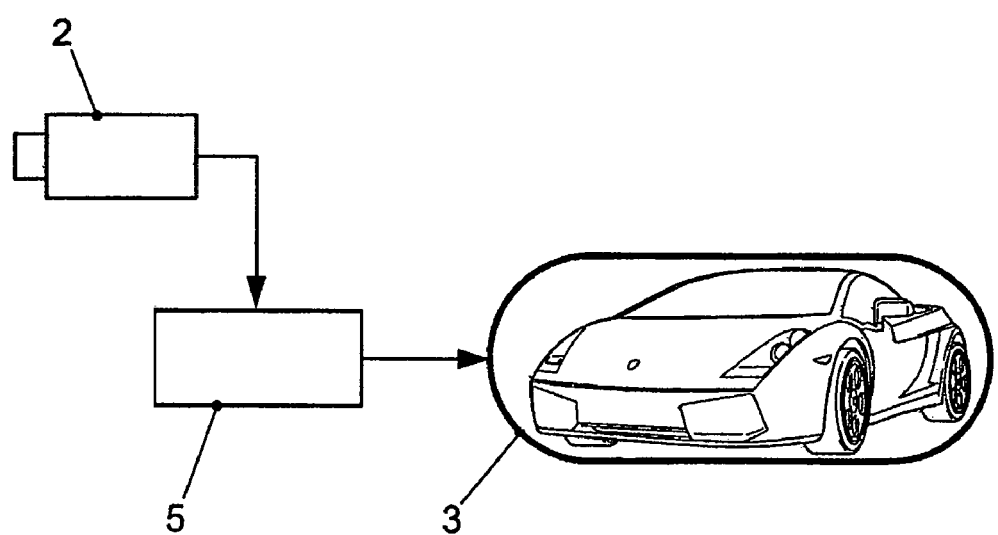
FIG. 2 shows an example of embodiment of a rearview mirror connected to a camera by an IT system.
Figure 3:
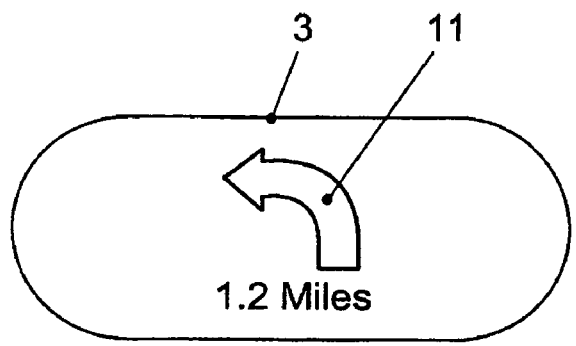
FIG. 3 shows an example of embodiment of a display in a rearview mirror.
Figure 4:
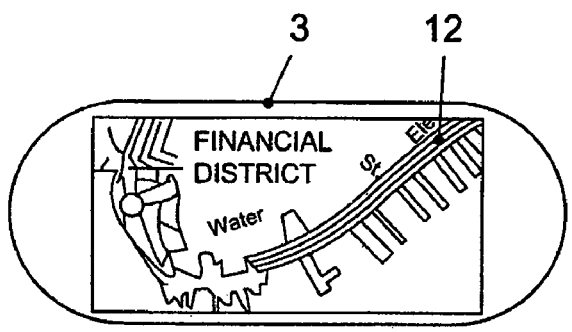
FIG. 4 shows another example of embodiment of a display in a rearview mirror.
Figure 5:
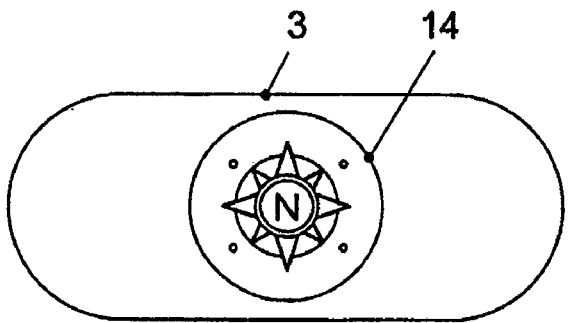
FIG. 5 shows another example of embodiment of a display in a rearview mirror.

Alternatively or in addition to the representation shown in FIG. 2 of a picture taken by the camera 2, also, as shown in FIG. 3, FIG. 4, FIG. 5, FIG. 6, FIG. 7 and FIG. 8, other pictures may be displayed by means of the rearview mirror 3. Thus FIG. 3 shows an example of embodiment of the display of a direction notice 11 generated by a navigation system in the rearview mirror 3. FIG. 4 shows an example of embodiment of the display of a road map 12 generated by a navigation system in the rearview mirror 3, and FIG. 5 shows an example of embodiment of a display of a geographic direction notice 14 in the rearview mirror 3 generated by a compass.

Figure 6:
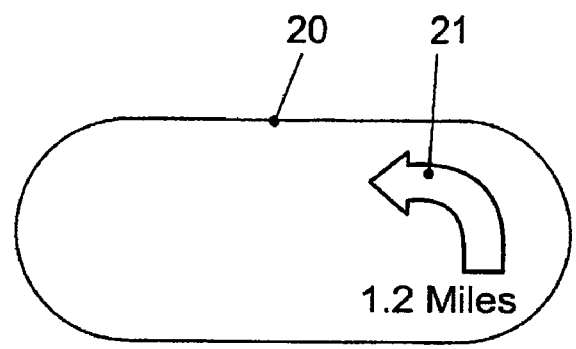
FIG. 6 shows another example of embodiment of a display in a rearview mirror.
Figure 7:
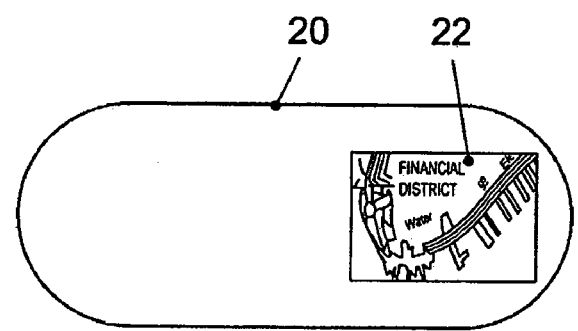
FIG. 7 shows another example of embodiment of a display in a rearview mirror.
Figure 8:
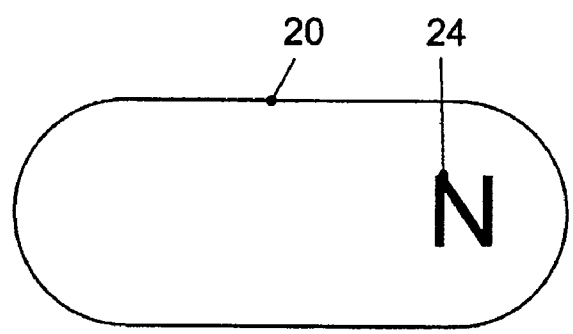
FIG. 8 shows another example of embodiment of a display in a rearview mirror.

With the rearview mirror 3 a display, as is shown in FIG. 2 and FIG. 4, can extend over a significant part of the rearview mirror 3. However, it may also be provided that only a part of a rearview mirror can be used as a display while another part of such a rearview mirror may also be used in a display state as a mirror. FIG. 6, FIG. 7 and FIG. 8 show such a rearview mirror 20, where FIG. 6 shows an example of embodiment of the display of a direction notice 21 generated by a navigation system in the rearview mirror 20, FIG. 7 an example of embodiment of a display of a roadmap 22 generated by a navigation system in the rearview mirror 20, and FIG. 8 an example of embodiment of a display of a geographic direction notice 24 generated by a compass in the rearview mirror 20. In the case of the rearview mirror 20 only the right third of the rearview mirror 20 can be used as a display, while the left two thirds of the rearview mirror 20 may also be used as a mirror even in the display mode.

Alternatively or additionally, other information concerning the vehicle 1 such as the distance to an obstacle, the speed of the vehicle 1, etc., or the time can be displayed by the rearview mirror 3 and the rearview mirror 20, respectively.

Figure 9:
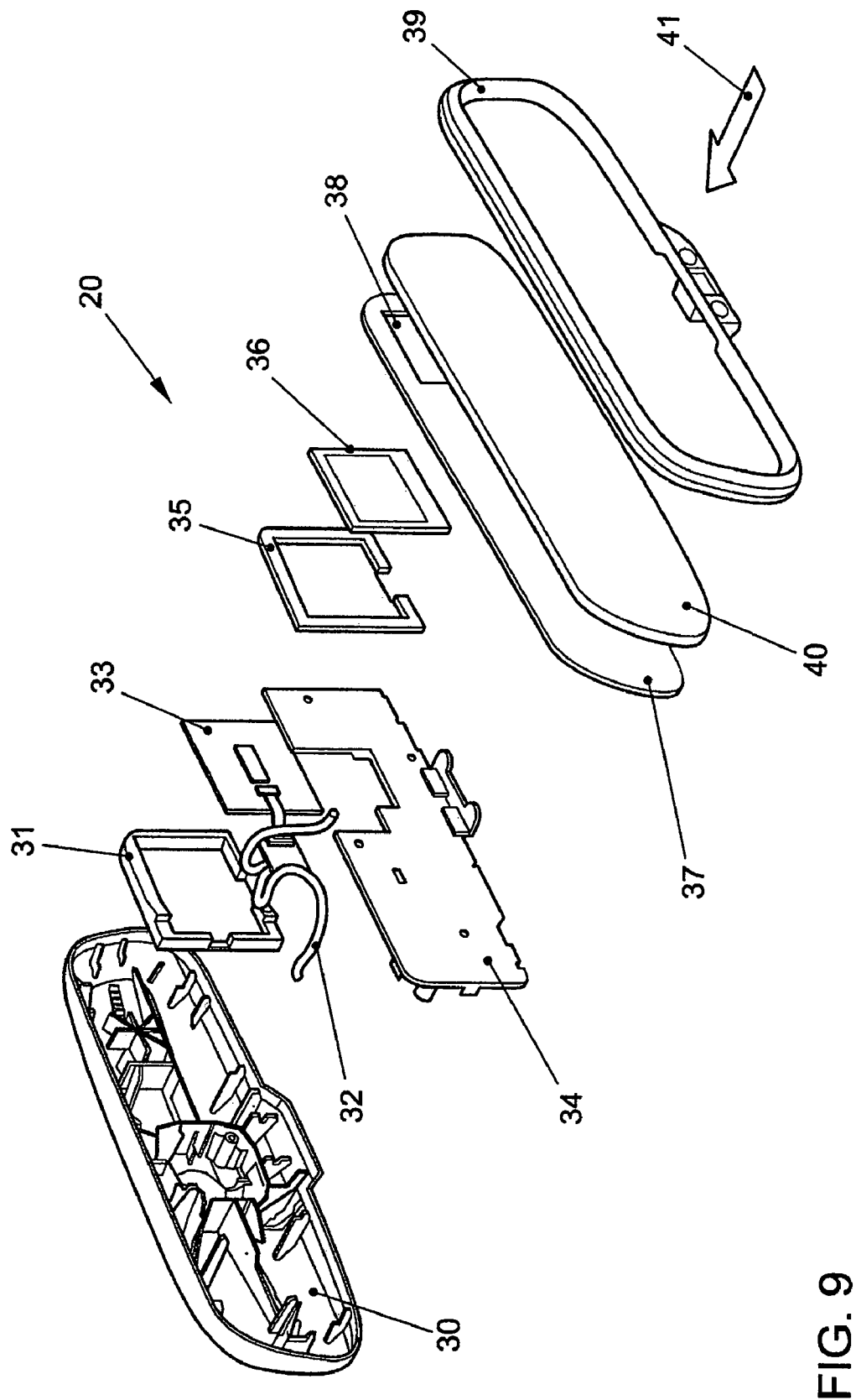
FIG. 9 shows an example of embodiment of a rearview mirror in an exploded view.

FIG. 9 shows the rearview mirror 20 in an exploded view. In this case the reference number 30 denotes a rearview mirror housing. Reference number 31 denotes a circuit board housing for holding a circuit board 33 with a control system for a display layer 36 configured as an OLED. Reference number 32 denotes a cable for connecting the circuit board 33, and reference number 35 a housing for holding the display layer 36. The display layer 36 is arranged in a recess 38 of a template 37 which in turn is arranged behind a mirror layer 40 relative to a viewing direction 41. Reference number 39 denotes a frame that can be joined together with the mirror housing 30. Reference number 34 denotes a circuit board for implementing other functions of the rearview mirror 20 such as implementing a dimmer function. The circuit boards 33 and 34 may also be replaced by a single circuit board. The rearview mirror 3 is configurable in a manner corresponding to the example of the rearview mirror 20 shown in FIG. 9. However, in this case a larger recess and a correspondingly larger display layer are to be provided. The template 37 may also be omitted.

Figure 10:
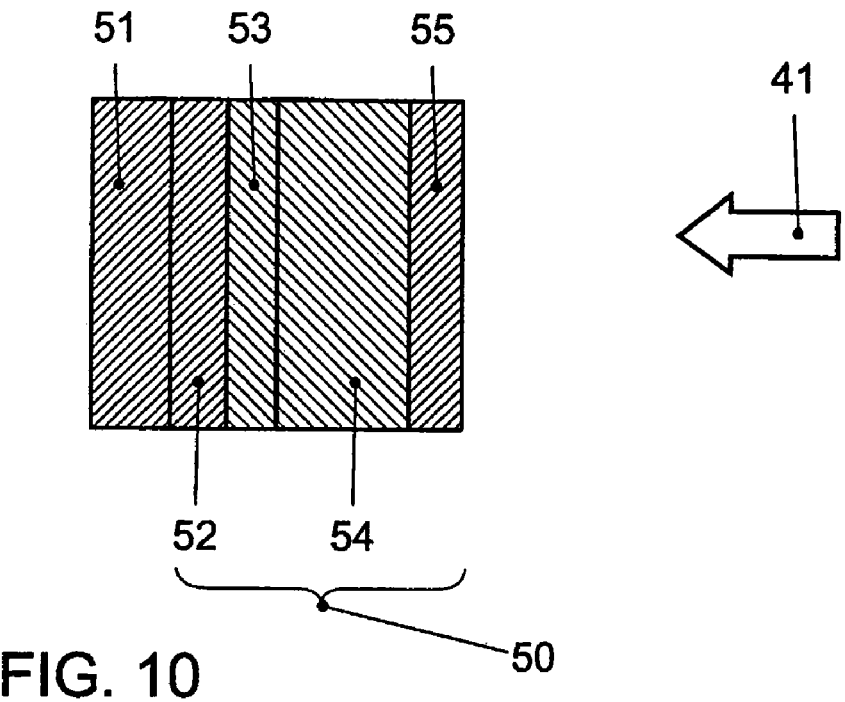
FIG. 10 shows an example of embodiment of a mirror layer.

FIG. 10 shows a cross section of an example of embodiment of a mirror layer 50 for use as a mirror layer 40 according to FIG. 9 with an OLED layer 51 corresponding to the display layer 36 arranged on a side of the mirror layer 50 facing away from the viewing direction 41. The mirror layer 50 includes a glass layer 54 and a semitransparent reflector layer 53 arranged behind the glass layer 54 relative to the viewing direction 41. The semitransparent reflector layer 53 is transparent for light emitted by the OLED layer 51 but reflects light striking the rearview mirror 20 from the viewing direction 41. In a preferred variant, the semitransparent reflector layer 53 includes one or more compounds of the group $TiO_2$, $SiO_2$, and $HfO_2$, especially a mixture of all of these compounds. Such a semitransparent reflector layer 53 has a transparency of more than 99%, especially a transparency of more than 99.5%, for light striking the semitransparent reflector layer 53 against the viewing direction 41.

Figure 11:
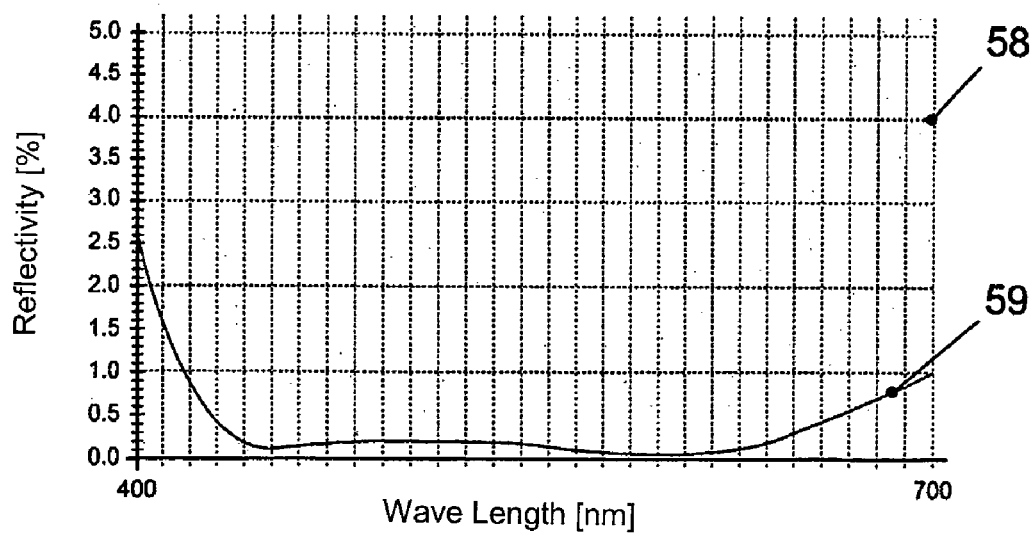
FIG. 11 shows a reflectivity plotted against a wavelength of light.

Between the OLED layer 51 and the semitransparent reflector layer 53 and relative to the viewing direction 41 in front of the glass layer 54, one anti-reflection layer 52 and 55 is arranged each. Suitable anti-reflection layers are sold by Integrated Optical Services Corp., 291 Sinclair Frontage Rd., Milpitas, Calif. 95035, USA and Southwall Technologies Corp., 3975 East Bayshore Rd., Palo Alto, Calif. 94303, USA. Details on the anti-reflection layers are also disclosed at the URL www.cvilaser.com/static/tech_arcoatings.asp?Print Friendly>>TRUE. FIG. 11 shows the reflectivity 59 of a suitable anti-reflection layer plotted against the wavelength of light. Reference number 58 in this case denotes the reflectivity without an anti-reflection layer.

Figure 12:
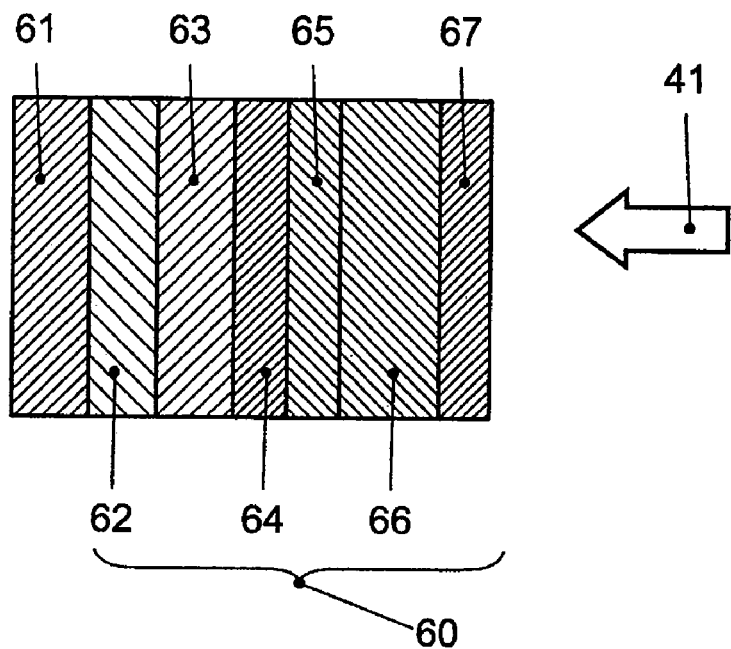
FIG. 12 shows another example of embodiment of a mirror layer.

FIG. 12 shows a cross section of an example of embodiment of a mirror layer 60 that is improved relative to the example of embodiment of FIG. 10 for use as a mirror layer 40 as in FIG. 9 with a display layer 61 configured in particular as an OLED layer, corresponding to display layer 36 on a side of the mirror layer 60 facing away from the viewing direction 41. The mirror layer 60 contains a glass layer 66 and a semitransparent reflector layer 65 arranged behind the glass layer 66 relative to the viewing direction 41, corresponding to the semitransparent reflector layer 53. One anti-reflection layer 64 and 67 each corresponding to the anti-reflection layer 52 and 55 is arranged behind the semitransparent reflector layer 65 relative to viewing direction 41 and in front of the glass layer 66 relative to viewing direction 41.

The mirror layer 60 also contains a quarter waveplate 63 arranged behind the anti-reflection layer 64 relative to viewing direction 41 and an absorbing linear polarization layer 62 arranged between the display layer 61 and the quarter waveplate 63. The absorbing linear polarization layer 62 is essentially transparent for polarized light emitted essentially in a through-going direction of the absorbing linear polarization layer 62 and absorbs the polarized light emitted by the display layer 61 essentially orthogonally to the through-passing direction of the absorbing linear polarization layer 62.

Figure 13:
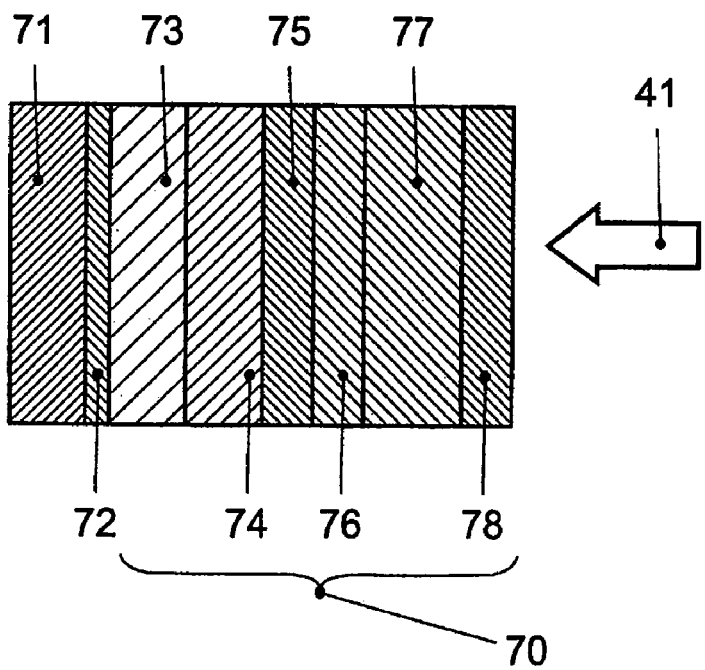
FIG. 13 shows another example of embodiment of a mirror layer.

FIG. 13 shows a cross section of an example of embodiment of a mirror layer 70 that is further improved relative to the example of embodiment of FIG. 12 for use as a mirror layer 40 as in FIG. 9 with an OLED layer 71, corresponding to display layer 36, on a side of the mirror layer 70 facing away from the viewing direction 41, with a reflecting surface 72. Details on suitable OLED layers with a reflecting surface may be obtained from U.S. Pat. No. 6,747,618 (incorporated by reference), U.S. Pat. No. 6,753,999 (incorporated by reference), U.S. Pat. No. 6,481,851 (incorporated by reference), U.S. Pat. No. 6,407,408 (incorporated by reference) and US 2004/0069985 A1 (incorporated by reference).

The mirror layer 70 contains a glass layer 77 and a semitransparent reflector layer 76 arranged, relative to the viewing direction 41, behind the glass layer 77, corresponding to the semitransparent reflector layer 53. Relative to the viewing direction 41, optionally an anti-reflection layer 75, corresponding to anti-reflection layer 52 and 55, is arranged behind the semitransparent reflector layer 76. Relative to the viewing direction 41, an anti-reflection layer 78, corresponding to anti-reflection layer 52 and 55, is arranged in front of the glass layer 77.

The mirror layer 70 also contains a quarter waveplate 74 arranged relative to viewing direction 41 behind the anti-reflection layer 75 and behind the semitransparent reflector layer 76 and a reflecting linear polarization layer 73 especially designed as a so-called DBEF filter layer, arranged between the display layer 71 and the quarter waveplate 74. The reflecting linear polarization layer 73 is essentially transparent for polarized light emitted by the display layer 71 essentially in a through-going direction of the reflecting linear polarization layer 73 and reflects the polarized light emitted by the display layer 71 essentially orthogonally to the through-passing direction of the reflecting linear polarization layer 73.

Figure 14:
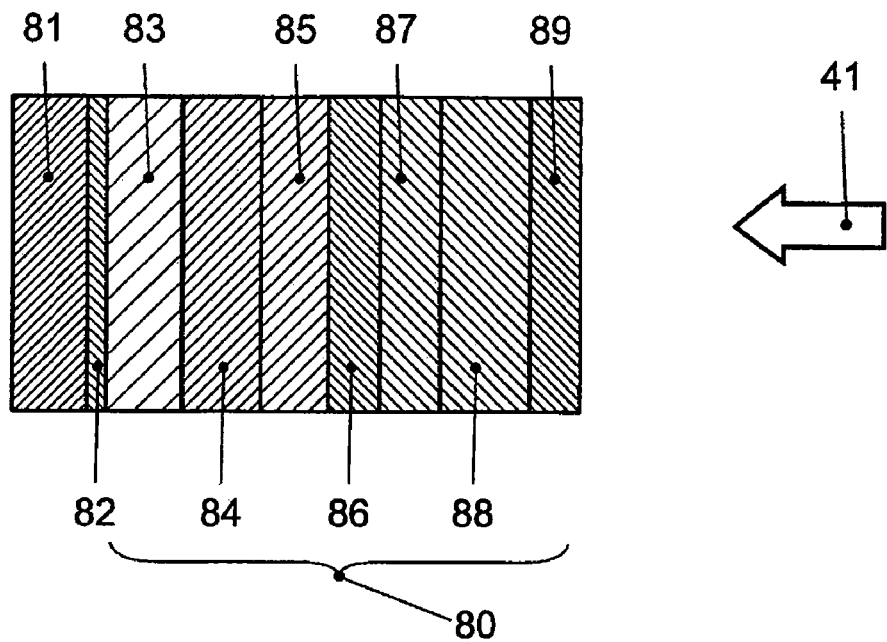
FIG. 14 shows another example of embodiment of a mirror layer.

FIG. 14 shows a cross section of an especially suitable example of embodiment of a mirror layer 80 for use as a mirror layer 40 according to FIG. 9 with an OLED layer 81 with a reflecting surface 82 corresponding to the display layer 36, arranged on a side of the mirror layer 80 facing away from the viewing direction 41. The mirror layer 80 contains a glass layer 88 and a semitransparent reflector layer 87 arranged behind the glass layer 88, relative to the viewing direction 41, corresponding to the semitransparent reflector layer 53. Behind the semitransparent reflector layer 87 relative to the viewing direction 41 optionally an anti-reflection layer 86, corresponding to the anti-reflection layer 52 and 55, is arranged. Relative to the viewing direction 41, an anti-reflection layer 89, corresponding to anti-reflection layer 52 and 55, is arranged in front of the glass layer 88.

The mirror layer 80 contains a quarter waveplate 85 arranged, relative to viewing direction 41, behind the anti-reflection layer 86 and behind the semitransparent reflector layer 87 and an absorbing linear polarization layer 84 arranged between the display layer 81 and the quarter waveplate 85. Between the absorbing linear polarization layer 84, a reflecting linear polarization layer 83, designed especially as a DBEF filter layer, is arranged. The reflecting linear polarization layer 83 is essentially transparent for polarized light emitted by the display layer 81 essentially in a through-going direction of the reflecting linear polarization layer 83 and reflects the polarized light emitted by the display layer 81 essentially orthogonally to the through-passing direction of the reflecting linear polarization layer 83. The absorbing linear polarization layer 84 is essentially transparent for polarized light emitted by the display layer 81 essentially in a through-going direction of the absorbing linear polarization layer 84 and absorbs the polarized light emitted by the display layer 81 essentially orthogonally to the through-passing direction of the absorbing linear polarization layer 84. The through-passing direction of the absorbing linear polarization layer 84 is essentially parallel to the through-passing direction of the reflecting linear polarization layer 83.

The arrangement of quarter waveplate 85, absorbing linear polarization layer 84 and reflecting linear polarization layer 83 can be replaced by a so-called DRD filter.

Figure 15:
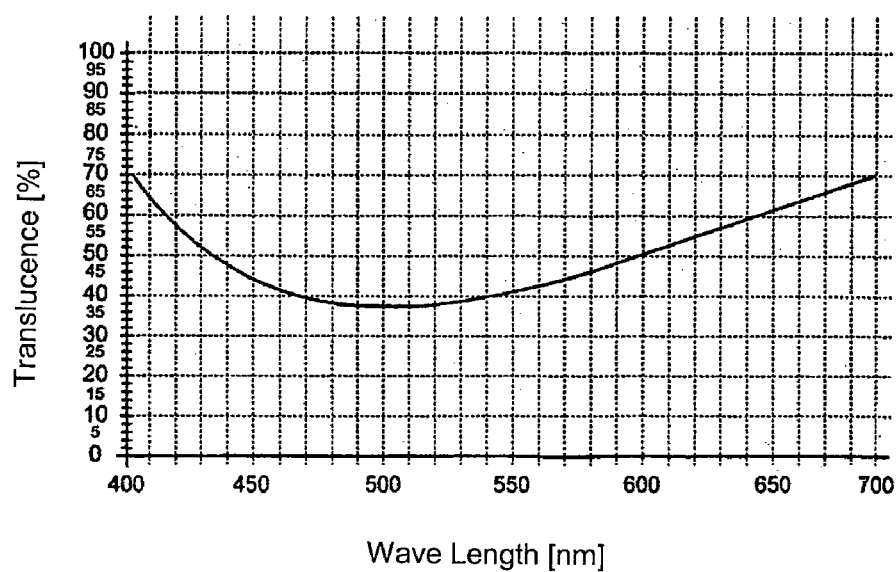
FIG. 15 shows a light permeability plotted against a wavelength of light.

A rearview mirror 3 or 20 configured according to the arrangement in FIG. 14 permits the display of especially high-contrast and sharp and simultaneously bright images. Therefore, in the case of the light-emitting display layer 81, a brightness of more than 350 $cd/m^2$, especially of more than 400 $cd/m^2$, can be achieved for light emerging from the rearview mirror 3 or 20 against the viewing direction 41. That means, in a region of the rearview mirror 3 or 20 in which the display layer 81 delivers its full illuminating power, light with a brightness of more than 350 $cd/m^2$, especially more than 400 $cd/m^2$, is emitted. With some OLEDs brightness of even more than 500 $cd/m^2$ is achievable. FIG. 15 shows the proportion of the light emittable by the display layer 81 against the viewing direction 41 that emerges against the viewing direction 41 from the rearview mirror 3 or 20, implemented according to FIG. 14, plotted against wavelength. In this case FIG. 15 shows that for every relevant wavelength in the visible region at least 45% of the light emitted by the display layer 81 against the viewing direction 41 emerges against the viewing direction 41 from the rearview mirror 3 or 20 implemented according to FIG. 14.

It is envisioned in particular that the quarter waveplates 63, 74, 85, the absorbing linear polarization layers 62, 84, and the reflecting linear polarization layers 73, 83 are especially passive layers.

Figure 16:
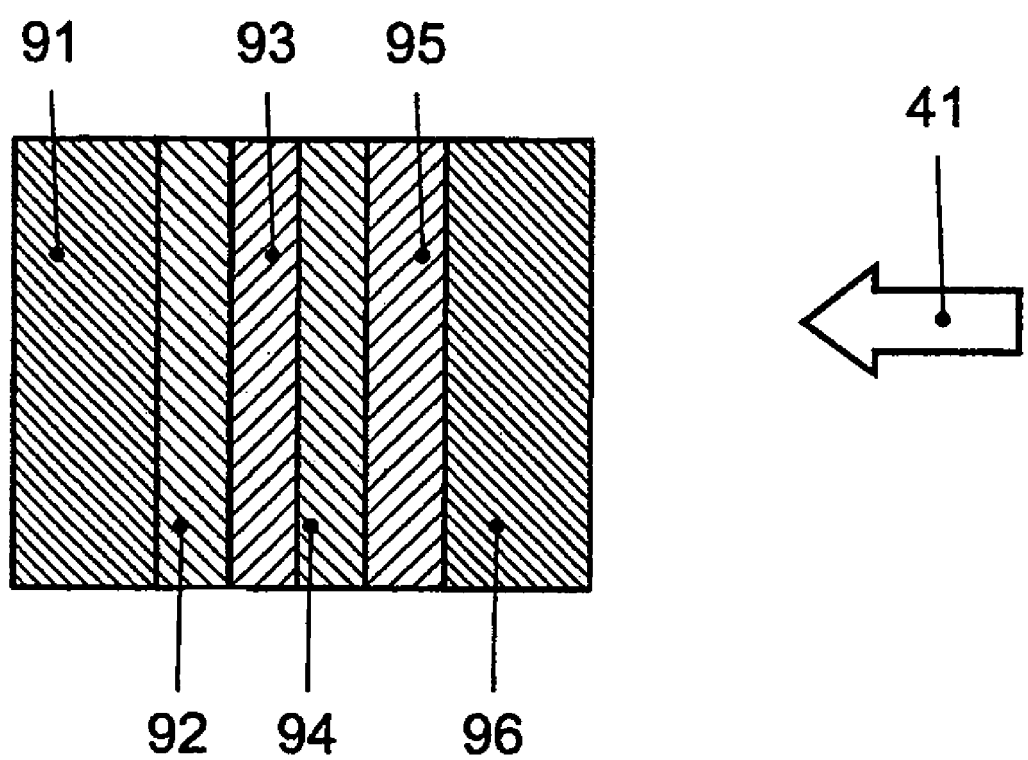
FIG. 16 shows an example of embodiment of a part of a mirror layer for implementing a dimming function.

FIG. 16 shows an example of embodiment of a part of a mirror layer for implementation of a dimming function, wherein this part replaces the arrangement of semitransparent reflector layer 53 and glass layer 54 in FIG. 10, the arrangement of semitransparent reflector layer 65 and glass layer 66 in FIG. 12, the arrangement of semitransparent reflector layer 76 and glass layer 77 in FIG. 13 and the arrangement of semitransparent reflector layer 87 and glass layer 88 in FIG. 10 for implementation of a dimming function. The part of a mirror layer shown in FIG. 16 includes a glass layer 91 and a glass layer 96, where a semitransparent reflector layer 92 is arranged between the glass layer 91 and glass layer 96 relative to the viewing direction 41 in front of glass layer 91. Between glass layer 96 and the semitransparent reflector layer 92 a dimming layer is arranged, which contains an electrochromatic layer 94 arranged between two ITO electrodes 93 and 95.

Optionally, an anti-reflection layer corresponding to anti-reflection layer 52 and 55 is arranged between the semitransparent reflector layer 92 and the ITO electrode 93 and/or between the ITO electrode 95 and the glass layer 96.

The elements and layers in the figures were drawn with consideration of simplicity and clarity and are not necessarily true to scale. Thus, for example, the orders of magnitude of some elements or layers are clearly exaggerated relative to other elements or layers in order to improve the understanding of the examples of embodiment of the present invention.

| List of reference numbers | |
|---|---|
| 1 | Motor vehicle |
| 2 | Camera |
| 3, 20 | Rearview mirror |
| 5 | Video adapters |
| 11, 21 | Direction notice |
| 12, 22 | Roadmap |
| 14, 24 | Geographic direction notice |
| 30 | Rearview mirror housing |
| 31 | Circuit board housing |
| 32 | Cable |
| 33, 34 | Circuit board |
| 35 | Housing |
| 36, 61 | Display layer |
| 37 | Template |
| 38 | Recess |
| 39 | Frame |
| 40, 50, 60, 70, 80 | Mirror layer |
| 41 | Viewing direction |
| 51, 71, 81 | OLED layer |
| 52, 55, 64, 67, 75, 78, 86, 89 | Anti-reflection layer |
| 53, 65, 76, 87, 92 | Semitransparent reflector layer |
| 54, 66, 77, 88 91, 96 | Glass layer |
| 58, 59 | Reflectivity |
| 62, 84 | Absorbing linear polarization layer |
| 63, 74, 85 | Quarter waveplate |
| 72, 82 | Reflecting surface |
| 73, 83 | Reflecting linear polarization layer |
| 93, 95 | ITO electrode |
| 94 | Electrochromatic layer |

What is claimed is:

1. A rearview mirror for a motor vehicle, comprising:
   a reflector layer for reflecting light that strikes the rearview mirror from a viewing direction;
   a display layer for emitting light arranged behind the reflector layer relative to the viewing direction;
   a quarter waveplate arranged between the display layer and the reflector layer; and
   a reflecting linear polarization layer arranged between the display layer and the quarter waveplate, wherein the rearview mirror further comprises an absorbing linear polarization layer arranged between the quarter waveplate and the reflecting linear polarization layer.

2. The rearview mirror according to claim 1, wherein said rearview mirror further comprises an anti-reflection layer arranged in front of the quarter waveplate relative to the viewing direction.

3. The rearview mirror according to claim 1, wherein the anti-reflection layer is connected to the quarter waveplate.

4. The rearview mirror according to claim 1, wherein the quarter waveplate is a passive layer.

5. The rearview mirror according to claim 1, wherein the reflecting linear polarization layer is a passive layer.

6. The rearview mirror according to claim 1, wherein the display layer comprises an OLED layer.

7. The rearview mirror according to claim 1, wherein the reflector layer has a transparency of more than 99% for light striking the reflector layer against the viewing direction.

8. The rearview mirror according to claim 1, wherein the reflector layer has a transparency of more than 99.5% for light striking the reflector layer against the viewing direction.

9. The rearview mirror according to claim 1, wherein the reflector layer includes one or more compounds of the group of $TiO_2$, $SiO_2$, and $HfO_2$.

10. The rearview mirror according to claim 1, wherein the reflector layer includes $TiO_2$, $SiO_2$, and $HfO_2$.

11. The rearview mirror according to claim 1, wherein at least 40% of the light emittable by the display layer against the viewing direction emerges from the rearview mirror against the viewing direction.

12. The rearview mirror according to claim 1, wherein at least 45% of the light emittable by the display layer against the viewing direction emerges from the rearview mirror against the viewing direction.

13. The rearview mirror according to claim 1, wherein a brightness of more than 350 $cd/m^2$ is achieved for light emerging from the rearview mirror against the viewing direction in the case of a light emitting display layer.

14. The rearview mirror according to claim 1, wherein a brightness of more than 400 $cd/m^2$ is achieved for light emerging from the rearview mirror against the viewing direction in the case of a light emitting display layer.

15. The rearview mirror according to claim 1, wherein a brightness of more than 500 $cd/m^2$ is achieved for light emerging from the rearview mirror against the viewing direction in the case of a light emitting display layer.

16. A rearview mirror for a motor vehicle, comprising:
   a reflector layer for the reflection of light striking the rearview minor from a viewing direction, said reflector layer including $HfO_2$;
   a display layer arranged behind the reflector layer relative to the viewing direction for emitting light;
   a quarter waveplate arranged between the display layer and the reflector layer; and
   an absorbing linear polarization layer arranged between the quarter waveplate and the reflector layer.

17. The rearview mirror according to claim 16, wherein the reflector layer contains $TiO_2$, $SiO_2$, and $HfO_2$.

18. The rearview mirror according to claim 16, further comprising an anti-reflection layer arranged between the display layer and the reflector layer.

19. The rearview mirror according to claim 16, further comprising an anti-reflection layer arranged between the quarter waveplate and the reflector layer.

20. The rearview mirror according to claim 16, wherein the display layer comprises an OLED layer.

21. The rearview mirror according to claim 16, wherein the reflector layer has a transparency of more than 99% for light striking the reflector layer against the viewing direction.

22. The rearview mirror according to claim 16, wherein the reflector layer has a transparency of more than 99.5% for light striking the reflector layer against the viewing direction.

23. The rearview mirror according to claim 16, wherein at least 40% of the light emittable by the display layer against the viewing direction emerges from the rearview mirror against the viewing direction.

24. The rearview mirror according to claim 16, wherein at least 45% of the light emittable by the display layer against the viewing direction emerges from the rearview mirror against the viewing direction.

25. The rearview mirror according to claim 16, wherein a brightness of more than 350 $cd/m^2$ is achieved for light emerging from the rearview mirror against the viewing direction in the case of a light emitting display layer.

26. The rearview mirror according to claim 16, wherein a brightness of more than 400 $cd/m^2$ is achieved for light emerging from the rearview mirror against the viewing direction in the case of a light emitting display layer.

27. The rearview mirror according to claim 16, wherein a brightness of more than 500 $cd/m^2$ is achieved for light emerging from the rearview mirror against the viewing direction in the case of a light emitting display layer.

28. A rearview mirror for a motor vehicle, comprising:
   a reflector layer for reflecting light that strikes the rearview mirror from a viewing direction;
   a display layer arranged behind the reflector layer relative to the viewing direction for emitting light in a direction against the viewing direction, where at least 40% of the light emittable by the display layer against the viewing direction emerges from the rearview mirror against the viewing direction; and
   an absorbing linear polarization layer arranged between the display layer and the reflector layer.

29. The rearview mirror according to claim 28, wherein at least 45% of the light emittable by the display layer against the viewing direction emerges from the rearview mirror against the viewing direction.

30. The rearview mirror according to claim 28, wherein a brightness of more than 350 $cd/m^2$ is achieved for light emerging from the rearview mirror against the viewing direction in the case of a light emitting display layer.

31. The rearview mirror according to claim 28, wherein a brightness of more than 400 $cd/m^2$ is achieved for light emerging from the rearview mirror against the viewing direction in the case of a light emitting display layer.

32. The rearview mirror according to claim 28, wherein a brightness of more than 500 $cd/m^2$ is achieved for light emerging from the rearview mirror against the viewing direction in the case of a light emitting display layer.

33. The rearview mirror according to claim 28, further comprising an anti-reflection layer arranged behind the reflector layer relative to the viewing direction.

34. The rearview mirror according to claim 28, further comprising an anti-reflection layer arranged in front of the reflector layer relative to the viewing direction.

35. The rearview mirror according to claim 28, wherein the display layer comprises an OLED layer.

36. The rearview mirror according to claim 28, wherein the reflector layer has a transparency of more than 99% for light striking the reflector layer against the viewing direction.

37. The rearview mirror according to claim 28, wherein the reflector layer has a transparency of more than 99.5% for light striking the reflector layer against the viewing direction.

38. The rearview mirror according to claim 28, wherein the reflector layer includes one or more compounds of the group of $TiO_2$, $SiO_2$ and $HfO_2$.

39. The rearview mirror according to claim 28, wherein the reflector layer contains $TiO_2$, $SiO_2$ and $HfO_2$.

* * * * *